US012686151B2

(12) United States Patent
Eloy et al.

(10) Patent No.: US 12,686,151 B2
(45) Date of Patent: Jul. 21, 2026

(54) SYSTEM FOR THE FORMULATION AND DELIVERY OF MATERIALS TO MOLDING MACHINES

(71) Applicant: GM GLOBAL TECHNOLOGY OPERATIONS LLC, Detroit, MI (US)

(72) Inventors: Erik Venancio de Mello Eloy, Gravataí (BR); Marcus Vinicius Rosa da Silveira, Esteio (BR); Elizeu Miguel Faleiro, Sapucaia do Sul (BR); Giuseppe Varriale, São Leopoldo (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 891 days.

(21) Appl. No.: 18/064,553

(22) Filed: Dec. 12, 2022

(65) Prior Publication Data

US 2024/0190046 A1 Jun. 13, 2024

(51) Int. Cl.
*B29B 7/26* (2006.01)
*B29B 7/24* (2006.01)

(52) U.S. Cl.
CPC ............... *B29B 7/26* (2013.01); *B29B 7/244* (2013.01)

(58) Field of Classification Search
CPC ............................ B01F 35/189; B01F 35/718; B01F 35/75465; B01F 35/71805; B29B 7/26; B29B 7/244
See application file for complete search history.

(56) References Cited

U.S. PATENT DOCUMENTS

| | | | | |
|---|---|---|---|---|
| 4,955,550 A * | 9/1990 | Satake | ................... | B29B 7/728 222/14 |
| 5,110,521 A * | 5/1992 | Moller | .................. | B01F 35/881 366/156.1 |
| 5,282,548 A * | 2/1994 | Ishihara | .............. | B29C 45/1858 222/64 |
| 5,344,619 A * | 9/1994 | Larwick | ........... | B01F 35/71775 422/135 |
| 2015/0027576 A1 * | 1/2015 | Li | ........................... | B01F 33/84 137/897 |
| 2015/0157995 A1 * | 6/2015 | Fordyce | .................. | B01F 25/64 366/150.1 |
| 2018/0072555 A1 * | 3/2018 | Fortunato | .......... | G06Q 20/3274 |
| 2020/0156311 A1 * | 5/2020 | Rolland | ............... | B29C 64/255 |
| 2023/0235233 A1 * | 7/2023 | Peguin | ................... | C10G 9/007 585/241 |
| 2024/0375064 A1 * | 11/2024 | Dudret | .................. | B01F 35/189 |

FOREIGN PATENT DOCUMENTS

| | | |
|---|---|---|
| DE | 2411808 A1 | 9/1974 |
| DE | 102010039025 A1 | 2/2012 |
| DE | 102012210606 A1 | 12/2013 |

* cited by examiner

*Primary Examiner* — Marc C Howell
(74) *Attorney, Agent, or Firm* — Ingrassia Fisher & Lorenz, LLP | IFL

(57) ABSTRACT

Systems are provided for system for delivering plural materials to plural molding machines according to defined formulations. Material supply units each contains a unique material and is coupled with a set of manifolds that have a mixing chambers. Conduits couple the material supply units with the manifolds. A controller is configured to operate valves to admit select materials from the material supply units into the mixing chamber according to the defined formulations, and to supply the mixed materials to the molding machines.

20 Claims, 4 Drawing Sheets

SYSTEM FOR THE FORMULATION AND DELIVERY OF MATERIALS TO MOLDING MACHINES

INTRODUCTION

The present disclosure generally relates to systems for automatically formulating molding materials and more particularly relates to automatically selecting, mixing and delivering multiple constituents to an injection molding machine formulated for the product being formed.

Molding is one of the most common ways to form manufactured products. For example, a given product is generally produced from a specific raw material that is fed into an injection molding machine. Each product may require a defined formula for the raw material, which may be delivered in solid form for melting, injecting into, and forming in a die. When an injection molding machine is changed-over to switch production to a different product, a differently formulated raw material feedstock may be needed. Preparing the feedstock may require formulating a homogeneous mixture from different powder, granular or pelletized ingredients. Proper following of the formula and thorough mixing of the components in the feedstock may be necessary to ensure that the molded part has the desired material properties. A lack of homogeneity may lead to undesirable properties and/or inclusions. In certain applications, multiple constituents may be included in the formulation. The materials may be prepared in a variety of forms, and may include any or all of the foregoing elements, as well as other ingredients.

The raw material, formulated for the given product's requirements, is delivered to the feed hopper of the injection molding machine. Operation of an injection molding machine includes metering an appropriate amount of the formulated material from the feed hopper into a cylinder for injection into the mold by a plunger or screw system. Delivering the correct material formulation for a given product may be a manually intensive procedure including mixing the formulation and manually filling a bin or hopper with the correct material mix.

Accordingly, it is desirable to provide systems for efficiently delivering the correct material to molding machines on a timely basis. Furthermore, other desirable features and characteristics of the present invention will become apparent from the subsequent detailed description and the appended claims, taken in conjunction with the accompanying drawings and the foregoing introduction.

SUMMARY

Systems are provided for delivering plural materials to plural molding machines according to defined formulations. Material supply units each contains a unique material and are coupled with a set of manifolds that each has a mixing chamber. Conduits couple the material supply units with the manifolds. A controller is configured to operate valves to admit select materials from the material supply units into the mixing chamber according to the defined formulations, and to supply the mixed materials to the molding machines.

In additional embodiments, the mixing chamber is configured to mix the first material with the second material.

In additional embodiments, the manifold defines a vent opening and an additional valve is configured to alternatively open and close the vent opening.

In additional embodiments, the controller is configured to open the additional valve in the event of a fault in at least one of the other valves.

In additional embodiments, the manifold defines an outlet. A vacuum system is coupled with the outlet and is configured to draw the materials through the outlet.

In additional embodiments, the manifold includes a section, with a pair of conduits coupled to the manifold at the section. The manifold includes another section disposed below the first section that is shaped with a taper and is configured to mix the materials.

In additional embodiments, the valves include disks configured to close the conduits from the mixing chamber and each valve includes an actuator with a rod fixed to the respective disk, the rod extending across the mixing chamber when the respective valve is closed.

In additional embodiments, the formulation is carried/ specified by a tag at the molding machine. A reader is configured to supply the formulation from the tag to the controller.

In additional embodiments, the manifold includes plural inlets corresponding to the plural supply units and includes a single outlet that is a sole outlet of the manifold.

In additional embodiments, plural molding machines are included, wherein each of the plural molding machines is configured to receive the materials from the plural material supply units.

In a number of other embodiments, a system for delivering plural materials to a molding machine according to a defined formulation includes a manifold defining a mixing chamber. Plural material supply units are coupled with the manifold, each one of the plural material supply units configured to contain materials, each one of which differs from the other materials in the plural material supply units. The plural material supply units including at least a first material supply unit containing a first material and a second material supply unit containing a second material. A conduit couples one material supply unit with the manifold. Another conduit couples another material supply unit with the manifold. A valve is configured to alternatively open and close the mixing chamber to the one conduit and another valve is configured to alternatively open and close the mixing chamber to the other conduit. Actuators are coupled with the valves and a controller is configured to operate the actuators to open and close the valves to admit at least one of the materials into the mixing chamber according to the defined formulation.

In additional embodiments, the mixing chamber includes a section that is tapered and is configured to mix the first material with the second material.

In additional embodiments, the manifold defines a vent opening disposed above the conduits, and an additional valve is configured to alternatively open and close the vent opening.

In additional embodiments, the controller is configured to open the additional valve to stop all of the materials from entering the mixing chamber in the event of a fault in any of the other valves.

In additional embodiments, the manifold defines an outlet disposed below the conduits. A vacuum system is coupled with the outlet. The vacuum system is configured to draw the materials from the conduits and through the outlet.

In additional embodiments, the manifold includes a section that has a cuboid shape, with the conduits coupled to the manifold at that section. Another section of the manifold is disposed below that section and is shaped with a taper that is configured to mix the materials.

In additional embodiments, the valves each include a disk configured to close the conduits from the mixing chamber and each includes an actuator disposed on a side of the manifold opposite the conduits. The actuators each include a rod fixed to the respective disk. Each rod extends across the mixing chamber to its respective disk.

In additional embodiments, a die is loaded in the molding machine. The formulation is carried by a tag on the die. A reader is configured to read the tag and supply the formulation from the tag to the controller.

In additional embodiments, the manifold includes plural inlets corresponding to the plural supply units and includes an outlet that is a sole outlet of the manifold. A vacuum system is coupled with the outlet to draw one or more of the materials into the mixing chamber.

In a number of further embodiments, a system is provided for delivering plural materials to plural molding machines according to defined formulations. A formulating system including a number of manifolds, each defining a mixing chamber, wherein each one of the plural molding machines is coupled with a unique one of the number of manifolds. A set of material supply units is coupled with each manifold in the number of manifolds. Each material supply unit in the set of material supply units is configured to contain a material which differs from other materials in other material supply units in the set material supply units. In other words, each material supply unit contains a unique material. A conduit network couples all of the material supply units in the set of material supply units with all of the manifolds in the number of manifolds. A plural number of valves is configured to control communication of the materials between the set of material supply units and the number of manifolds. A controller is configured to operate a set of actuators to open and close the plural number of valves to selectively admit the materials into the mixing chambers according to the defined formulations so that any combination of the materials is supplied to each of the molding machines.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or this detailed description.

Figure 1:
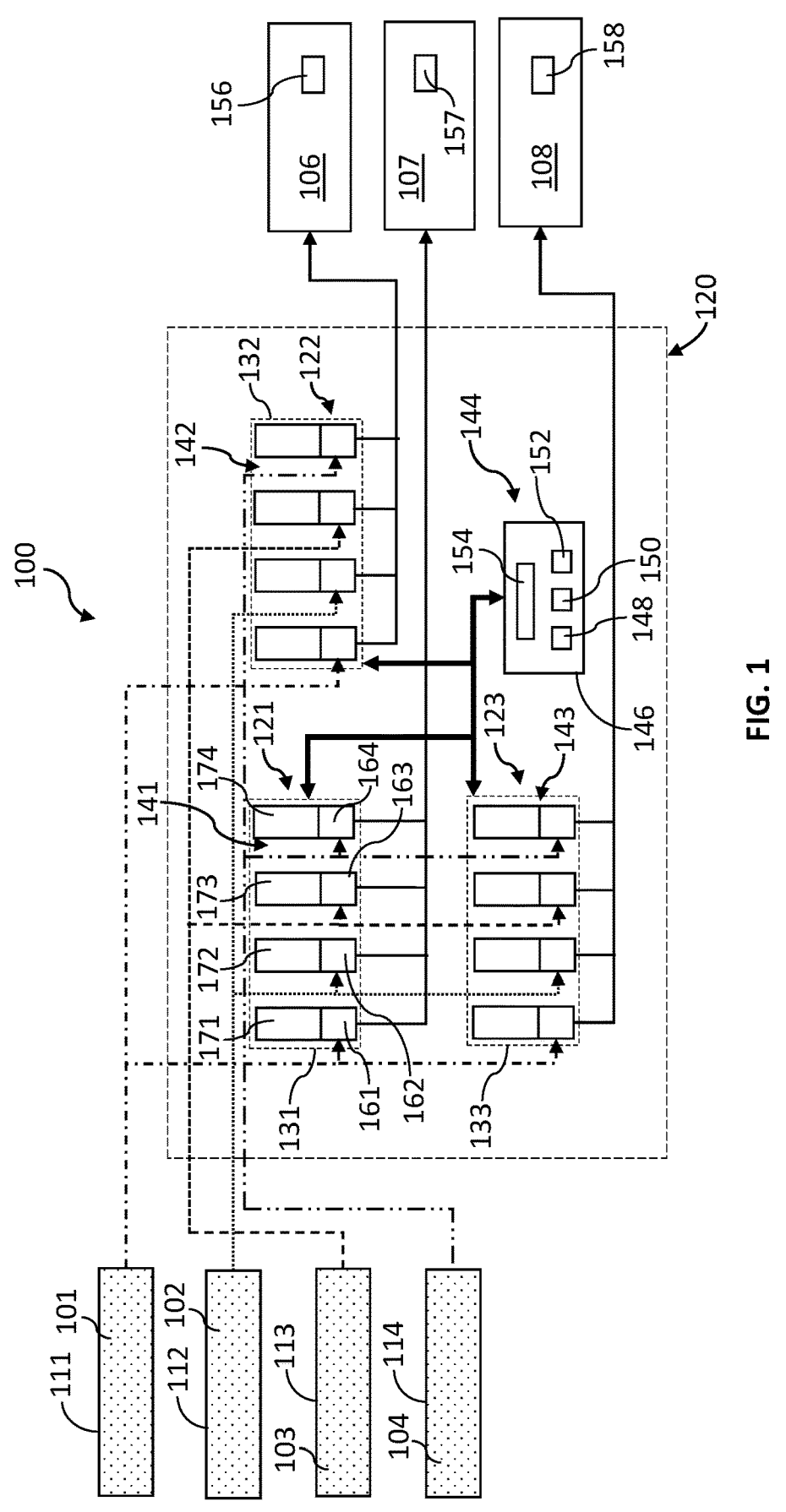
FIG. 1 is a schematic illustration of a system for automated formulation and delivery of materials to molding machines, in accordance with various embodiments.

Referring to FIG. 1, a system 100 is illustrated for automated formulation and delivery of materials 101-104 to injection molding machines 106-108. While the system 100 is depicted as delivering materials 101-104 to injection molding machines 106-108, the system 100 is not limited to feeding a specific type of machine but may be employed in delivering material in any application where selecting from plural materials is desired to match a formulation that requires mixing and delivery. In other embodiments, the system 100 may be configured to deliver any number of materials, such as one or more materials and so is not limited to the four materials 101-104. In addition, the system 100 is not limited to serving three machines, such as the injection molding machines 106-108, but may be configured to serve any number of machines or other devices that require the delivery of materials, such as the materials 101-104.

As depicted in FIG. 1, the materials 101-104 to be delivered to the injection molding machines 106-108, are contained in four material supply units 111-114. Each of the four materials 101-104 is different than the others of the four materials 101-104. For example, the materials 101-104 may comprise multiple polymers, binders, hardeners, and/or other materials required for by product molding material formulation. The materials 101-104 may be solids in powder, granular, pellet, or other form contained in bulk in the material supply units 111-114. As such, the material supply units 111-114 are loaded with the materials 101-104 and may be configured to maintain those materials 101-104 in desirable conditions. In the current embodiment, the material supply units are configured as dehumidifiers that may dry the materials 101-104, and/or that may maintain the moisture level of the materials 101-104 at a preferred range. Humidity level may be controlled so that the materials 101-104 convey properly and to avoid undesirable effects of moisture content vaporization in the injection molding machines 106-108. In other embodiments, the materials 101-104 may be contained in another form of material supply units 111-114, which may be configured as dryers, bins, bags, or as other containers.

Included in the system 100, and connected between the material supply units 111-114 and the injection molding machines 106-108, is a formulating system 120. The formulating system 120 includes three formulating units 121-123. The formulating units 121-123 are disposed to receive all of the materials 101-104 and to forward mixes of select ones of those materials 101-104 to the injection molding machines 106-108. The current embodiment includes three formulating units 121-123, with one dedicated to one each of the injection molding machines 106-108. In other embodiments, one of the formulating units 121-123 may supply plural of the injection molding machines 106-108. In additional embodiments, plural of the formulating units 121-123 may supply one of the injection molding machines 106-108. In general, the formulating units 121-123 receive, depending on the recipe for the part being formed, any or all of the materials 101-104, mix the received materials 101-104, and deliver them to the respective injection molding machine 106-108.

Each of the formulating units 121-123 includes a respective mixing chamber 131-133 configured to mix those of the materials 101-104 that are received. Each of the formulating units 121-123 also includes a respective material control system 141-143 that controls which of the materials 101-104 are received by the formulating units 121-123. For example, the material control systems 141-143 may control which of the materials 101-104 is admitted into each of the mixing chambers 131-133. The formulating system 120 also includes a control system 144, including a controller 146. The controller 146 may be an industrial programmable logic controller or may be any programmable controller with a processor 148 and a memory 150 and/or a storage device 152 for carrying out programmed instructions and generating control signals. The controller 146 may be programmed or supplied, such as by being manually entered, with data on the type of materials 101-104 contained in the material supply units 111-114. An interface 154 couples the controller 146 with the material control systems 141-143. The interface may be an electrical bus, a pneumatic control system, a hydraulic control system, a mechanical system, or a combination of any of thereof.

Each of the materials control systems 141-143 includes a set of four actuated valves with one corresponding to each of the materials 101-104. For example, the material control system 141 includes valves 161-164 and respective actuators 171-174 for operating those valves 161-164. The actuators 171-174 operate to move the valves 161-164 in response to the control system 144. For example, the controller 146 may command, as communicated through the interface 154, any of the valves 161-164 to open to supply the respective material(s) 101-104 through the formulating system 120 to the injection molding machine 106. The valve(s) 161-164 that are opened supply those of the materials 101-104 that correspond to the formula designated for the product produced in a die 158 in the injection molding machine 106. The injection molding machines 106-108 are configured to produce any number of different parts, each of which is formed in a die 156-158 respectively, that is dedicated to producing that part and contains cavities corresponding to the shape of the parts being formed. It will be appreciated that in embodiments, any one of the individual dies 156-158 may have cavities shaped to produce plural part designs, when those plural designs have the same material formulation. The controller 146 may be coupled with the injection molding machines 106-108 to receive the formulations for the dies 156-158. The formulations may be automatically delivered to the controller 146 when the dies 156-158 are loaded in the respective injection molding machine 106-108, such as by a sensed tag, such as an RFID tag, or they may be manually input or otherwise delivered to the controller 146.

Figure 2:
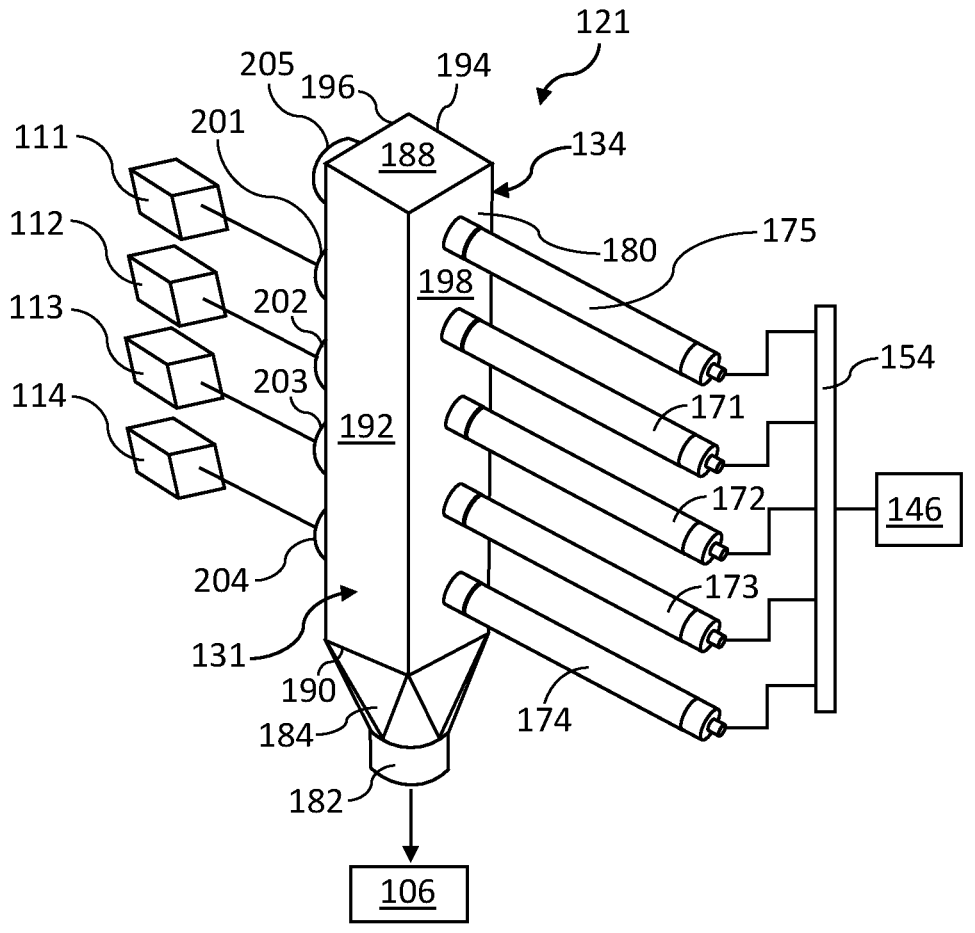
FIG. 2 is a perspective illustration of a mixing chamber manifold of the system of FIG. 1, in accordance with various embodiments.

Referring to FIG. 2, illustrated are aspects of the formulating unit 121 and specifically of the area of the mixing chamber 131, as an example of the formulating units 121-123 and of the mixing chambers 131-133 which may be substantially identical. The mixing chamber 131 is defined by a manifold 134 that includes a section 180 that is shaped as a rectangular block (cuboid), a section 182 that is cylindrical shaped, and a section 184 that provides a transition from the section 180 to the section 182. The section 184 is tapered and configured to transition from a quadrilateral shape to a circular shape. The sections 180, 182 and 184 provide a housing in the form of the manifold 134 that defines the mixing chamber 131 as a hollow enclosed space through which the materials 101-104 may flow when admitted. The section 180 is elongated in the vertical direction and includes a top 188, a bottom 190, a front 192, a back 194, an inlet side 196 and a control side 198. The top 188, the front 192 and the back 194 are closed and may be planar sheets. The bottom 190 is open to the section 184 and therethrough to the section 182 and the injection molding machine 106. The inlet side 196 has couplings 201-204 as inlets corresponding to the number of materials supply units 111-114, and also includes an open vent 205. The control side 198 includes five actuators including the actuators 171-174 and an actuator 175 that is aligned with the vent 205. The actuators 171-175 are coupled with the interface 154.

Figure 3:
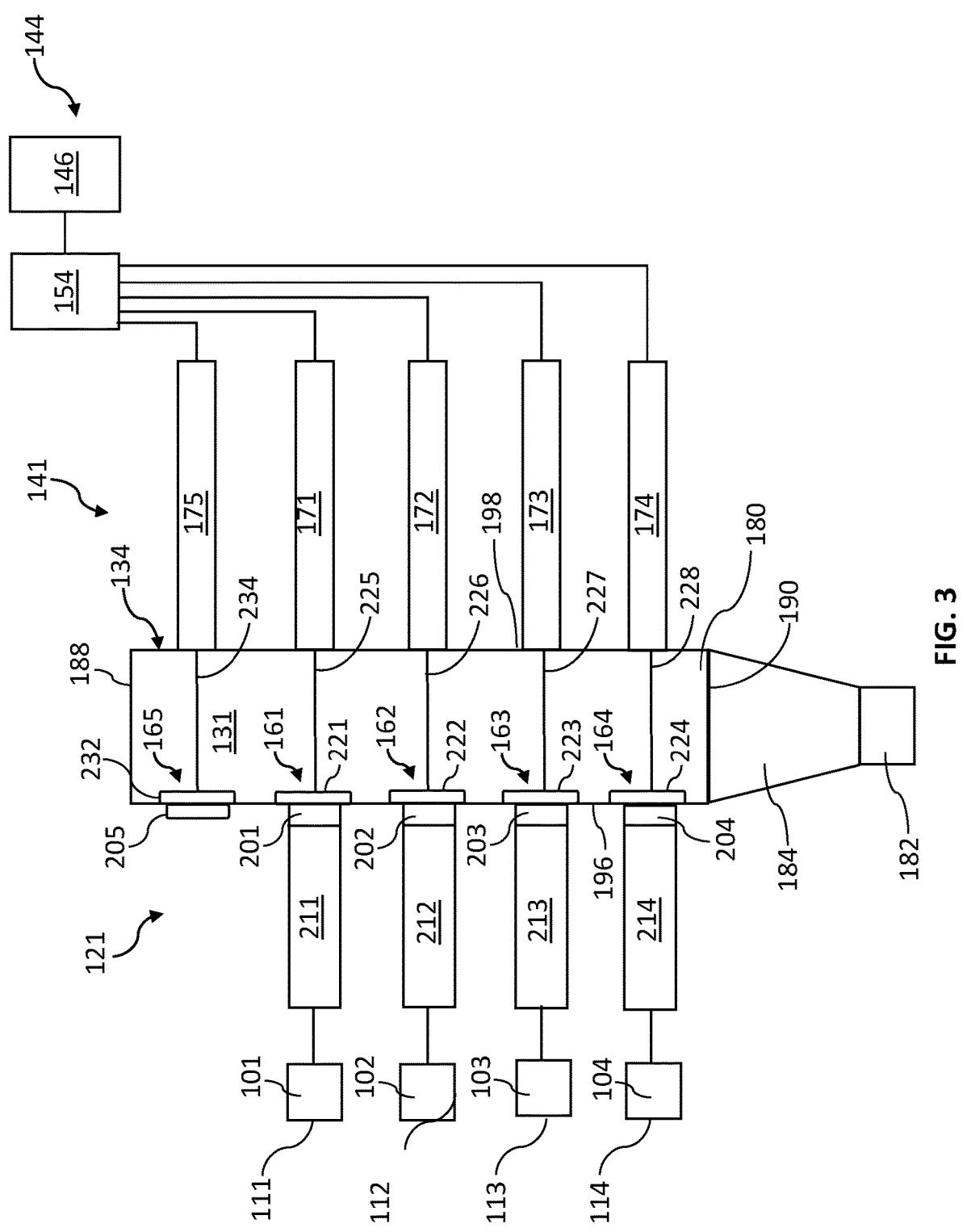
FIG. 3 is a schematic illustration of the mixing chamber manifold of FIG. 2 in a closed state, in accordance with various embodiments.

An embodiment of the formulating unit 121 is schematically illustrated in FIG. 3, to which reference is directed. The material supply units 111-114 are coupled with the manifold 134 at the couplings 201-204 respectively, through conduits 211-214. The conduits 211-214 are appropriate for conveying the materials 101-104 and in the current embodiment may be hoses or pipes. The diameter size of the conduits 211-214 may be selected to calibrate the amount of flow of the materials 101-104 that they convey.

The valves 161-164 are aligned to normally close the conduits 211-214 at the inlet side 196 of the manifold 134. In the current embodiment, the valves 161-164 are configured with disks 221-224 disposed inside the mixing chamber 131 that close the conduits 211-214 when positioned against the inlet side 196 at the couplings 201-204. Each of the valve disks 221-224 is connected with a respective rod 225-228, each of which is a part of a respective one of the actuators 171-174. The actuators 171-174 are mounted on the control side 198 of the manifold 134 and their rods 225-228 extend through the inside of the mixing chamber 131 across the manifold and toward the inlet side 196. A valve 165 is disposed to operate the vent 205 and is disposed in a normally closed position against the inlet side 196. The valve 165 includes disk 232 which is connected to a rod 234 of the actuator 175.

In the current embodiment, the actuators 171-175 are pneumatic cylinders operated by the controller 146 through the interface 154, which comprises a pneumatic controller. For example, the interface 154 may have valves that control operating pressure delivered to the actuators 171-175. In other embodiments, the actuators 171-175 may be electrically operated or hydraulically operated, for example. The actuators 171-175 may be single acting that operate under air pressure to open the valves 161-165 and that return to close the valves 161-165 under spring force, or may be double acting that operate under air pressure to open and to close the valves 161-165.

Figure 4:
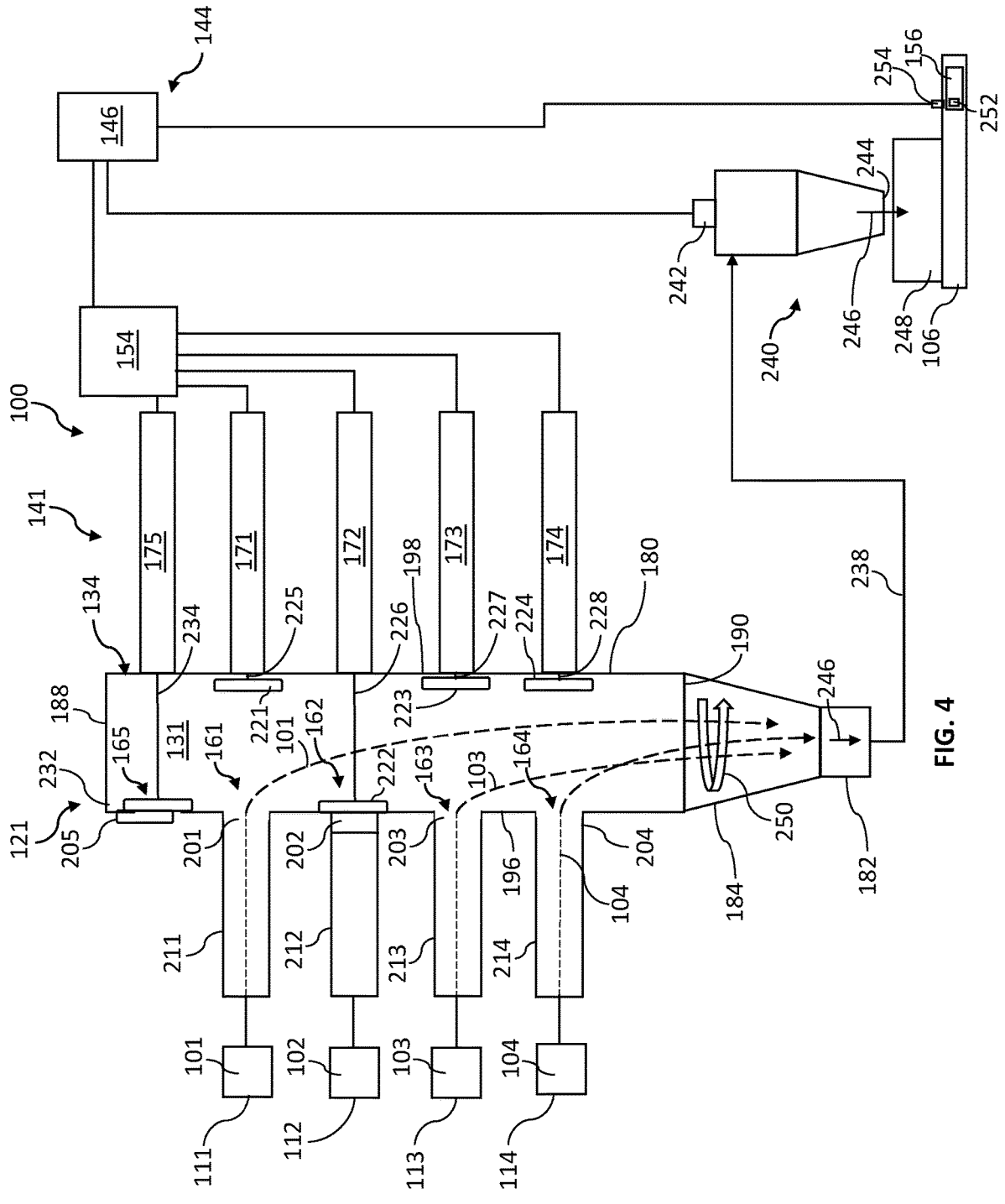
FIG. 4 is a schematic illustration of select parts of the system of FIG. 1 including the mixing chamber manifold of FIG. 2 in a feed state, in accordance with various embodiments.

Referring to FIG. 4, the formulating unit 121 is schematically illustrated in the system 100 in a feed state supplying material to the injection molding machine 106. The formulating unit 121 is coupled, via a conduit 238, with a vacuum system 240 that includes a fan 242 and an outlet 244. The fan 242 generates a vacuum pressure in the conduit 238 that draws a vacuum in the mixing chamber 131. The outlet 244 of the vacuum system 240 is disposed to deposit mixed and conveyed material 246 into a hopper 248 of the injection molding machine 106.

In an example, the product molded by the die 156 calls for a formulation of the material 246 that includes material 101, material 103 and material 104. This formulation is communicated to the controller 146. For example, the die 156 may carry a tag 252 with the formulation and the injection molding machine 106 may include a reader 254 disposed to read the tag 252 when the die 156 is loaded in the injection molding machine 106. The reader 254 is configured to transmit the formulation to the controller 146. In an embodiment, the formulation is communicated via a wire link. In other embodiments, the formulation may be communicated wirelessly.

In accordance with the communicated formulation, the controller 146 operates the actuators 171, 173 and 174 to open the valves 161, 163 and 164. The disks 221, 223 and 224 are retracted away from the inlet side 196, opening the conduits 211, 213 and 214 to the mixing chamber 131. Valves 162 and 165 remain closed. As a result, the vacuum system 240 draws the materials 101, 103 and 104 into the mixing chamber 131. Material 102 is not delivered to the mixing chamber 131. The three materials 101, 103 and 104 travel downward toward the bottom 190 of the section 180 and into the section 184. The tapered, cone-like shape of the section 184 creates swirl 250, which helps mix the materials 101, 103, 104. The mixed material 246 proceeds through the section 182 and the conduit 238 to the vacuum system 240 and is deposited in the hopper 248. Conveyance through the conduit 238 and the vacuum system 240 also assists in mixing the materials 101, 103, 104 into the material 246.

The formulating unit 121 may be calibrated to deliver a flow of the material 246 that matches the consumption rate of the injection molding machine 106. In other embodiments, the formulating unit 121 and/or the vacuum system 240 may operate on an intermittent time schedule to supply the injection molding machine 106 as needed. When the die 156 is changed-over, the valves 161-164 may be closed and the valve 165 opened with the vacuum system 240 running to purge the mixing chamber 131 and the conduit 238 of the previous material 246.

In the event that a fault is detected in the formulation, the controller 146 commands the actuator 175 to open the valve 165. This admits atmospheric pressure and relieves the vacuum in the mixing chamber 131 and stops material flow, even if others of the valves 161-164 remain open. For example, the actuators 171-174 may provide feedback signals to the controller 146 on the position status. If any of the positions do not match the formulation, the controller 146 may stop material flow by opening the valve 165 until the fault is corrected.

Accordingly, a system selects, mixes, and delivers raw material to molding machines according to a defined formulation of the part being produced. Efficient and automatic material changes may be made with reduced possibilities of errors. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for delivering plural materials to a molding machine according to a defined formulation, the system comprising:
    a manifold defining a mixing chamber;
    plural material supply units coupled with the manifold, each one of the plural material supply units configured to contain materials, each one of which differs from others in the plural material supply units, the plural material supply units including at least a first material supply unit containing a first material and a second material supply unit containing a second material;
    a first conduit coupling the first material supply unit with the manifold;
    a second conduit coupling the second material supply unit with the manifold;
    a first valve configured to alternatively open and close the mixing chamber to the first conduit, the first valve including a disk configured to close the first conduit from the mixing chamber and includes an actuator with a rod fixed to the disk, the rod extending across the mixing chamber when the first valve is closed;
    a second valve configured to alternatively open and close the mixing chamber to the second conduit; and
    a controller configured to operate the first valve and the second valve to admit at least one of the first material and the second material into the mixing chamber according to the defined formulation.

2. The system of claim 1, wherein the mixing chamber is configured to mix the first material with the second material.

3. The system of claim 1, wherein the manifold defines a vent opening and comprising a third valve configured to alternatively open and close the vent opening.

4. The system of claim 3, wherein the controller is configured to open the third valve in the event of a fault in at least one of the first valve and the second valve.

5. The system of claim 1, wherein the manifold defines an outlet, and comprising a vacuum system coupled with the outlet, wherein the vacuum system is configured to draw the first material and the second material through the outlet.

6. The system of claim 1, wherein the manifold includes:
    a first section, with the first conduit and the second conduit coupled to the manifold at the first section; and
    a second section disposed below the first section, the second section shaped with a taper configured to mix the first material with the second material.

7. The system of claim 1, wherein the manifold is a part of a formulating unit that is calibrated to deliver a flow of the materials that matches a consumption rate of the molding machine.

8. The system of claim 1, wherein the defined formulation is carried by a tag at the molding machine, and comprising a reader configured to supply the defined formulation from the tag to the controller.

9. The system of claim 1, wherein the manifold includes plural inlets corresponding to the plural material supply units and an outlet that is a sole outlet of the manifold.

10. The system of claim 1, wherein the molding machine is one of a plural number of molding machines, wherein each of the plural number of molding machines is configured to receive the materials from the plural material supply units through an arrangement of manifolds that includes the manifold.

11. A system for delivering plural materials to a molding machine according to a defined formulation, the system comprising:
    a manifold defining a mixing chamber;
    plural material supply units coupled with the manifold, each one of the plural material supply units configured to contain materials, each one of which differs from others in the plural material supply units, the plural material supply units including at least a first material supply unit containing a first material and a second material supply unit containing a second material;
    a first conduit coupling the first material supply unit with the manifold;
    a second conduit coupling the second material supply unit with the manifold;
    a first valve configured to alternatively open and close the mixing chamber to the first conduit;
    a second valve configured to alternatively open and close the mixing chamber to the second conduit;
    a first actuator coupled with the first valve;
    a second actuator coupled with the second valve; and
    a controller configured to operate the first actuator and the second actuator to open and close the first valve and the second valve to admit at least one of the first material and the second material into the mixing chamber according to the defined formulation, wherein the manifold defines a vent opening disposed above the first and second conduits, and comprising a third valve configured to alternatively open and close the vent opening, wherein the controller is configured to open the third valve to stop the first material and the second material from entering the mixing chamber in the event of a fault in at least one of the first valve and the second valve.

12. The system of claim 11, wherein the mixing chamber includes a section that is tapered and is configured to mix the first material with the second material.

13. The system of claim 11, wherein the manifold is a part of a formulating unit that is calibrated to deliver a flow of the materials that matches a consumption rate of the molding machine.

14. The system of claim 11, wherein the material supply units are configured as dehumidifiers.

15. The system of claim 11, wherein the manifold defines an outlet disposed below the first and second conduits, and comprising a vacuum system coupled with the outlet, wherein the vacuum system is configured to draw the first material and the second material from the first and second conduits and through the outlet.

16. The system of claim 11, wherein the manifold includes;

a first section that has a cuboid shape, with the first conduit and the second conduit coupled to the manifold at the first section; and a second section disposed below the first section, the second section shaped with a taper that is configured to mix the first material with the second material.

17. The system of claim 11, wherein the first valve includes a disk configured to close the first conduit from the mixing chamber and includes an actuator disposed on a side of the manifold opposite the first conduit, the actuator including a rod fixed to the disk, the rod extending across the mixing chamber to the disk.

18. The system of claim 11, comprising a die in the molding machine, wherein the formulation is carried by a tag on the die, and comprising a reader that is configured to supply the formulation from the tag to the controller.

19. The system of claim 11, wherein the manifold includes plural inlets corresponding to the plural material supply units and includes an outlet that is a sole outlet of the manifold, wherein a vacuum system is coupled with the outlet to draw at least one of the first material and the second material into the mixing chamber.

20. A system for delivering plural materials to plural molding machines according to defined formulations, the system comprising:

a formulating system including a number of manifolds, each defining a mixing chamber, wherein each one of the plural molding machines is coupled with a unique one of the number of manifolds;

a set of material supply units coupled with each manifold in the number of manifolds, each material supply unit in the set of material supply units configured to contain a material which differs from other materials in other material supply units in the set of material supply units;

a conduit network coupling all of the material supply units in the set of material supply units with all of the manifolds in the number of manifolds;

a plural number of valves configured to control communication of the materials between the set of material supply units and the number of manifolds;

a controller configured to operate a set of actuators to open and close the plural number of valves to selectively admit the materials into the mixing chambers according to the defined formulations; and a die in the molding machines, wherein the formulation is carried by a tag on the die, and comprising a reader that is configured to supply the formulation from the tag to the controller.

\*  \*  \*  \*  \*